H. M. GRAY.
PROCESS FOR RECOVERING SOAP.
APPLICATION FILED JUNE 1, 1915.
1,242,435.
Patented Oct. 9, 1917.
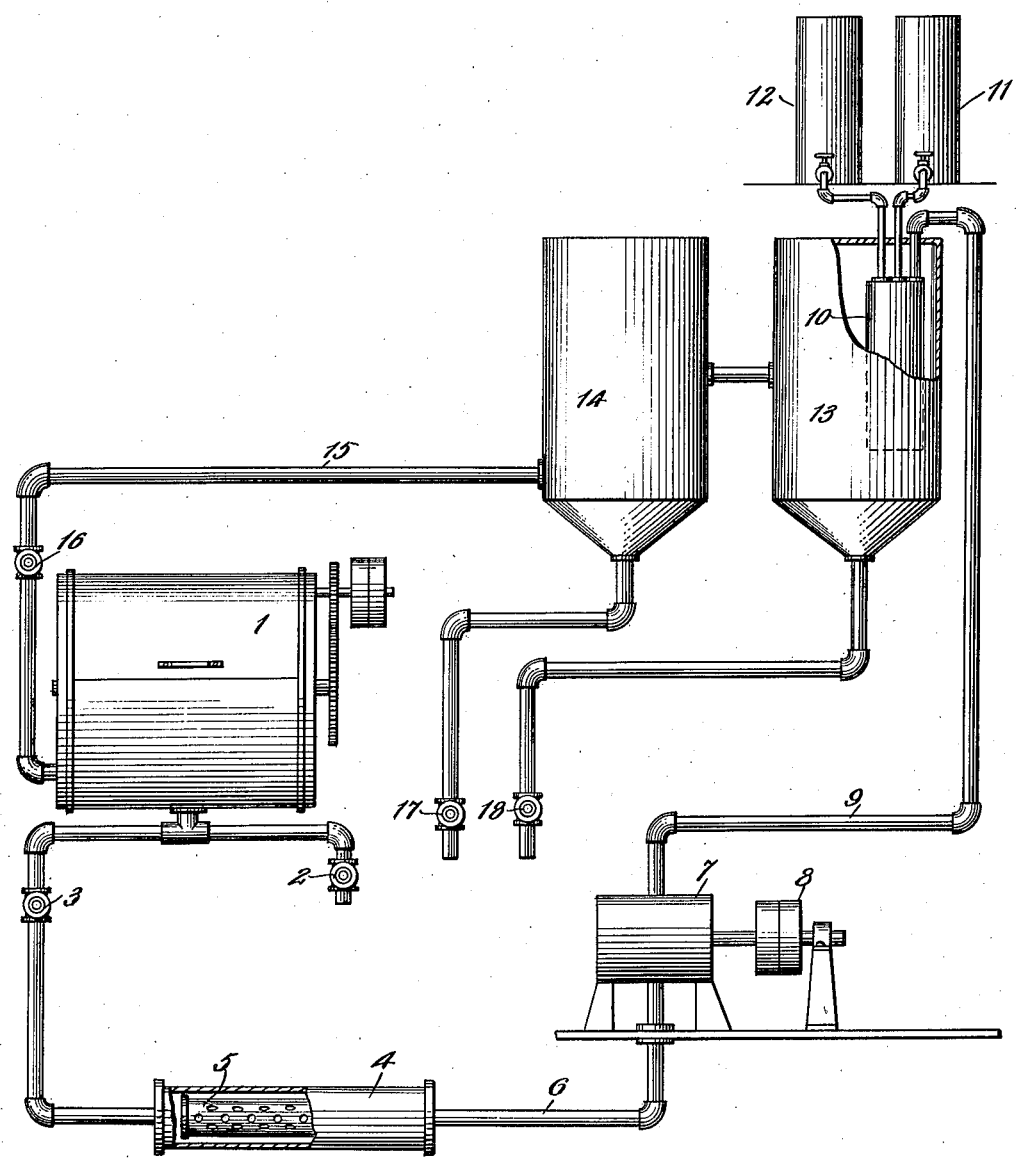

UNITED STATES PATENT OFFICE.

HARRY MILTON GRAY, OF LOS ANGELES, CALIFORNIA, ASSIGNOR, BY DIRECT AND MESNE ASSIGNMENTS, OF ONE-HALF TO MALCOLM ALLEN NEAL AND ONE-HALF TO EUGENE WESTON JONES, BOTH OF SAN FRANCISCO, CALIFORNIA.

PROCESS FOR RECOVERING SOAP.

1,242,435.     Specification of Letters Patent.     Patented Oct. 9, 1917.

Application filed June 1, 1915. Serial No. 31,481.

*To all whom it may concern:*

Be it known that I, HARRY MILTON GRAY, a citizen of the United States, residing at Los Angeles, in the county of Los Angeles and State of California, have invented a new and useful Process for Recovering Soap, of which the following is a specification.

This invention relates to a process for the recovery of the used soap that heretofore has been going to waste, in laundries and other cleaning establishments; the purification of this soap by the use of liquid caustic soda, coal oil, and chlorin water, or other chemicals of like nature; the precipitation of the dirt and impurities, the removal of the precipitate, and the subsequent reuse of the soap, over and over again, with the addition of fresh or new soap from time to time to keep it active and the purification to keep it clean, in an apparatus of which a description and drawing is hereto attached.

The novel features of the process, construction and combination, will be fully described in the subjoined specification; and that for which protection is asked, pointed out in the following claim.

Referring to the drawings:

Figure 1 is a washer, wherein the clothes are treated with soap and water and where the chlorin water is added in an amount and at a time that the operator judges by experience to be necessary; the washer is driven by a gear on the end from a shaft, not shown, and instead of running the suds out of valve 2, as is done in the old way, which leads to the waste drain, it is let out of valve 3, and then to the outside casing of the strainer, 4, through the strainer, 5, to the pipe, 6, then to the rotary pump, 7, which is driven by pulley, 8, from a shafting, not shown, into pipe, 9, and then into mixing chamber, 10, where it meets the caustic soda solution from tank, 11, and the coal oil from tank, 12, and together through the mixing chamber 10, to the bottom of tank 13.

The dirt here settles and is drawn off at valve, 18, into the drain; the clean soap passes over the connecting pipe to tank, 14, where it settles again and the precipitate is drawn off at valve, 17, into the drain; the clean soap is now ready to pass through pipe 15, to the washer, 1, through valve, 16.

Any number of washers can be connected with this process by tapping in on pipe, 15, above valve, 16, and below valve, 3, before the pipe enters the strainer.

By my improved arrangement and combination of parts, I am able to recover and purify, for reuse, nearly all the soap that has been going to waste, thereby effecting a great saving in time, money and material, which is a very great advantage to the laundry industry.

Having fully described my invention, what I claim as new, and desire to secure by Letters Patent, is:—

The process of recovering useful soap solutions which consists in treating dirty soap suds in a tank with suitable quantities of kerosene and alkali whereby impurities are separated by stratification from the dirty soap suds and then withdrawing from the tank for further use soap solutions freed from such impurities.

In testimony whereof I have hereunto set my hand at Los Angeles, California, this 26 day of May, 1915.

HARRY MILTON GRAY.

Witnesses:
DAVID ERNEST MILLER,
JOHN FRANKLIN LYNN.